US007339495B2

(12) United States Patent
Kavner

(10) Patent No.: US 7,339,495 B2
(45) Date of Patent: Mar. 4, 2008

(54) SYSTEM AND METHOD FOR READING LICENSE PLATES

(75) Inventor: Douglas M. Kavner, Orange, CA (US)

(73) Assignee: Raytheon Company, Waltham, MA (US)

(*) Notice: Subject to any disclaimer, the term of this patent is extended or adjusted under 35 U.S.C. 154(b) by 0 days.

(21) Appl. No.: 11/231,102

(22) Filed: Sep. 20, 2005

(65) Prior Publication Data

US 2006/0056658 A1 Mar. 16, 2006

Related U.S. Application Data

(62) Division of application No. 10/058,511, filed on Jan. 28, 2002, now Pat. No. 7,068,185.

(60) Provisional application No. 60/264,498, filed on Jan. 26, 2001, provisional application No. 60/264,424, filed on Jan. 26, 2001.

(51) Int. Cl.

| | |
|---|---|
| ***G08G 1/00*** | (2006.01) |
| ***G08G 1/01*** | (2006.01) |
| ***G08G 1/16*** | (2006.01) |
| ***H04N 7/18*** | (2006.01) |
| ***G06K 9/00*** | (2006.01) |
| ***G07B 15/00*** | (2006.01) |

(52) U.S. Cl. ...................... 340/933; 340/903; 340/928; 340/937; 340/932.2; 348/143; 348/148; 348/161; 382/104; 382/105; 701/117; 705/13

(58) Field of Classification Search ................ 340/903, 340/928, 933, 937; 348/143, 148, 161; 382/105; 701/117; 705/13

See application file for complete search history.

(56) References Cited

U.S. PATENT DOCUMENTS

| | | | | |
|---|---|---|---|---|
| 4,555,618 A | | 11/1985 | Riskin | |
| 4,817,166 A | * | 3/1989 | Gonzalez et al. | 382/105 |
| 4,963,723 A | | 10/1990 | Masada | |
| 5,081,685 A | * | 1/1992 | Jones et al. | 382/105 |
| 5,227,803 A | | 7/1993 | O'Connor et al. | |
| 5,253,162 A | | 10/1993 | Hassett et al. | |
| 5,289,183 A | | 2/1994 | Hassett et al. | |
| 5,310,999 A | | 5/1994 | Claus et al. | |

(Continued)

FOREIGN PATENT DOCUMENTS

| | | |
|---|---|---|
| EP | 0632410 | 11/1995 |

(Continued)

OTHER PUBLICATIONS

Kavner; U.S. Appl. No. 09/805,849; filed on Mar. 14, 2001.

(Continued)

*Primary Examiner*—Benjamin C. Lee
*Assistant Examiner*—Lam Pham
(74) *Attorney, Agent, or Firm*—Daly, Crowley, Mofford & Durkee, LLP

(57) ABSTRACT

A method for reading a license plate disposed on a vehicle includes determining whether a license plate image is required, automatically processing the license plate image in response to determining that the license plate image is required, providing at least one verified image, and determining whether to manually read the license plate image by matching the license plate image with the at least one verified image.

31 Claims, 8 Drawing Sheets

U.S. PATENT DOCUMENTS

| | | | | |
|---|---|---|---|---|
| 5,422,473 | A | 6/1995 | Kamata | |
| 5,485,520 | A | 1/1996 | Chaum et al. | |
| 5,640,156 | A * | 6/1997 | Okuda et al. | 340/928 |
| 5,651,075 | A * | 7/1997 | Frazier et al. | 382/105 |
| 5,675,494 | A | 10/1997 | Sakurai et al. | |
| 5,696,502 | A | 12/1997 | Busch et al. | |
| 5,696,503 | A | 12/1997 | Nasburg | |
| 5,801,943 | A | 9/1998 | Nasburg | |
| 5,948,038 | A | 9/1999 | Daly et al. | |
| 6,042,008 | A | 3/2000 | Ando et al. | |
| 6,078,895 | A | 6/2000 | Ryu et al. | |
| 6,109,525 | A | 8/2000 | Blomqvist et al. | |
| 6,111,523 | A | 8/2000 | Mee | |
| 6,140,941 | A | 10/2000 | Dwyer et al. | |
| 6,177,885 | B1 | 1/2001 | Weil et al. | |
| 6,449,555 | B1 | 9/2002 | Ohba et al. | |
| 6,747,687 | B1 * | 6/2004 | Alves | 348/148 |
| 6,922,156 | B2 | 7/2005 | Kavner | |
| 2002/0000920 | A1 | 1/2002 | Kavner | |
| 2002/0140577 | A1 | 10/2002 | Kavner | |
| 2002/0140579 | A1 | 10/2002 | Kavner | |

FOREIGN PATENT DOCUMENTS

| | | |
|---|---|---|
| EP | 0767446 | 4/1997 |
| EP | 0779600 | 6/1997 |
| EP | 0903916 | 3/1999 |
| GB | 2154832 | 9/1985 |
| GB | 2154832 A | 9/1985 |
| JP | 07254099 | 10/1995 |
| JP | 200057483 | 2/2000 |
| JP | 2000268291 | 9/2000 |
| WO | WO 99/33027 | 7/1999 |
| WO | WO 01/69569 | 9/2001 |

OTHER PUBLICATIONS

Rittich; Perspektiven der Verkehrsleittechnik; Backnang, DE;Apr. 9, 1992, pp. 111-119.

"Introduction to Safe-T-Cam," Safe-T-Cam from internet website http://www.rta/nsw.gov.au/registration/heavyvehicleinformation/safetcam/; Nov. 27, 2003; 2 sheets.

"Introduction to Safe-T Cam;" Safe-T Cam from internet website http://www.rta/nsw.gov.au/registration/heavyvehicleinformation/safetcam.index.html; Dec. 22, 2003, 3 sheets.

Pulnix America Inc.; Pulnix Preliminary Data Shee;t, Video Image Processing (VIP) Compute;r, Dec. 16, 1998.

Pulnix America Inc.; Pulnix Preliminary Data Sheet; Video Image Capture (VIC) Subsystem; Dec. 16, 1998; pp. 1-2.

Pulnix America Inc.; Pulnix Preliminary Data Sheet; Vehicle Imaging System (VIS) Subsystem; Apr. 15, 1999; pp. 1-2.

International Search Report;PCT Application No. PCT/US01/40298; dated Oct. 9, 2001.

PCT Search Report and Written Opinion of the ISA for PCT/US02/02472 dated Dec. 9, 2002 and Feb. 4, 2003 (respectively).

PCT Search Report and Written Opinion of the ISA for PCT/US02/039242 dated Oct. 21, 2002 and Jan. 23, 2003 (respectively).

* cited by examiner

SYSTEM AND METHOD FOR READING LICENSE PLATES

CROSS-REFERENCE TO RELATED APPLICATIONS

This application a Divisional Application of and claims the benefit of U.S. patent application Ser. No. 10/058,511 filed Jan. 28, 2002 now U.S. Pat. No. 7,068,185, which claims the benefit of U.S. Provisional Patent Application No. 60/264,498 filed on Jan. 26, 2001 and U.S. Provisional Patent Application No. 60/264,424 filed on Jan. 26, 2001, each of which is incorporated herein in its entirety.

FIELD OF THE INVENTION

This invention relates generally to electronic toll collection systems and more particularly to a system and method for reading vehicle license plates.

BACKGROUND OF THE INVENTION

In electronic or automatic toll collection applications, it is desirable to correctly identify a vehicle traveling on the roadway with minimal operator intervention. Furthermore, it is often necessary to read the vehicle license plate number included within an image or multiple images of a vehicle for billing and enforcement purposes. The images are obtained when a vehicle travels through a toll gate or an enforcement gateway. The toll gate may or may not have a device capable of physically blocking the passage of vehicles, such as a mechanical arm. The requirement to capture license plate images exists for lane based and open-road (no lane barrier) electronic toll collection systems. The license plate reading operation is typically performed using an automatic optical character recognition (OCR) system, a manual system, or a combination of both systems. Both OCR and manual reads are subject to errors which degrade performance and reduce revenues of the toll collection system. Automatic reading errors are typically different from human operator manual read errors, and two different operators viewing the same license plate image sometimes read different license plate numbers.

Some toll collection systems employ transponders to identify a vehicle automatically as it passes through a toll collection point. Sometimes the transponder is moved to an unauthorized vehicle or has been stolen from a vehicle. In such a situation it is useful to determine the license plate number(s) on the vehicle. In other toll collection systems it is not feasible to equip all vehicles, for example, vehicles which make sporadic use of the toll roadway, with a transponder. Furthermore, there is a need to read license plates in the event of transponder read failures to increase system reliability and to maintain billing revenues.

In automatic toll systems, incorrect identification of a vehicle or non-identification of a vehicle is costly. In conventional systems, the error rate ranges from two percent to ten percent. An error in a license plate reading results in lost revenue, increased customer support expenses and customer dissatisfaction when the customer is incorrectly billed. When a vehicle license plate cannot be identified, the toll revenue is not collected.

Conventional systems require multiple reads of every license plate image to verify that the plate is correct. This is a costly solution because typically at least one of the read operations must be performed manually by an operator. Other systems allow errors to be posted to customer accounts and wait for the customers to complain. Some of the plate reading problems can be corrected by manually reading the license plates. In a manual read operation, a human operator typically reads the license plate number from a stored image of the rear end of a vehicle having a license plate. The license plate image is captured at the time the vehicle traveled through a toll collection point or enforcement gateway. However the cost of manually reading a license plate is relatively expensive, and manual reading is not feasible for reading large numbers of license plates. Both conventional automatic license plate reading systems and conventional systems incorporating manual reading of images of license plates have inherently different problems reading license plate images. Operators manually reading a large number of license plates are subject to fatigue and are prone to an error rate which increases with the number of license plates read during a workday. Automatic image collection and processing is subject to image misreads, equipment malfunction and periodic maintenance.

It would, therefore, be desirable to read license plates with a minimal error rate and a minimum number of manual reads. It would be further desirable to effectively use license plate numbers read manually by a group of operators to minimize the error rate of an automatic license plate reading system and to utilize additional information collected on a vehicle's trip through an roadway having an automatic toll collection system to reduce the license plate reading error rate and the number of manual reads.

SUMMARY OF THE INVENTION

In accordance with the present invention, a method for reading a license plate disposed on a vehicle includes determining whether a license plate image is required, automatically processing the license plate image in response to determining that the license plate image is required, providing at least one verified image, and determining whether to manually read the license plate image by matching the license plate image with the at least one verified image. With such a technique, it is possible to determine when a license plate should be read manually by a human operator to supplement an automatic reading in order to increase plate reading accuracy and to reduce the overall number of manual reads.

In accordance with another aspect of the present invention, the method further includes correlating the license plate image with the at least one verified image, providing a match confidence measure and determining whether the license plate image should be read manually in response to comparing a match confidence measure to a predetermined match threshold With such a technique, image correlation of a license plate with a reliable stored image and available toll collection data improves the accuracy of the license plate reading system and reduces the number of manual reads.

In accordance with another aspect of the present invention, a method for reading a license plate disposed on a vehicle traveling within a toll collection system includes providing a first plurality of vehicle detections, determining a second plurality of vehicle detections which potentially form a trip, determining whether the second plurality of vehicle detections includes at least one license plate image; and automatically processing the at least one license plate image. With such a technique, several transactions can be combined into a single trip for billing purposes, for improving the accuracy of the license plate reading system and for reducing the number of manual reads.

In accordance with another aspect of the present invention, a method is provided for correlating the data with previously read data to obtain information on each of the plurality of vehicles, determining the number of each of the plurality of vehicles potentially affected by incidents along the roadway. Additionally, the method includes the step of comparing the number of each of the plurality of vehicles potentially affected by incidents to a sample threshold. With such a technique, the method can reduce incorrect license plate number determinations by analyzing data from widely spaced automatic vehicle identification (AVI) readers and license plate readers along a roadway. With such a technique, license plate identifications are more accurately determined than by using only image processing methods to determine license plate numbers, and such a technique does not rely on a high volume of manual reads by human operators.

In one embodiment traffic incident data is used to determine which detections potentially form a trip. The trip formation method is capable of accounting for variations in individual vehicle speed due to the possible presence of law enforcement personnel, varying road grades, mechanical breakdowns, service/rest station stops, vehicles entering from on-ramps, and vehicles exiting on off-ramps between sensor locations.

In accordance with a further aspect the present invention, a system for reading a vehicle license plate includes a plurality of roadside toll collectors providing a plurality of vehicle license plate images and a plurality of vehicle transactions, at least one transaction processor coupled to the plurality of roadside toll collectors, receiving the plurality of images and transactions, and at least one video image processor coupled to the at least one transaction processor and adapted to receive the images and for providing a corresponding license plate number. The system further includes a video exception processor coupled to the at least one transaction processor and adapted to receive the images and to display the images such that the vehicle license plate is read manually, and a toll processor coupled to the at least one transaction processor and adapted to minimize the number of manual reads. With such an arrangement, an automatic roadway toll collection and management system maintains and applies a set of historical plate images to achieve error reduction making use of a pattern matcher for selecting which plate images should be read/re-read by an operator to minimize plate read errors without incurring substantial additional operational cost by considering information related to a vehicle's trip in addition to the historical license plate image information. Such an arrangement solves the problem of the requirement for a relatively large number of manual license plate read operations by performing verifications and multiple reads only on those images likely to be in error. Thus, most images can be read only once, and in a system that utilizes OCR, the result is that most of the license plate images can completely bypass an operator without significantly degrading performance or increasing customer complaints. Such an arrangement makes use of, but is not limited to, automatic image processing techniques such as optical character recognition and image correlation.

In accordance with another aspect of the present invention, a method for reading a license plate to detect violators includes automatically recognizing the license plate number from a license plate image; determining that the vehicle license plate number is included in a list of violators subject to law enforcement, automatically displaying an alert, and automatically updating the location of the vehicle. Using this technique, law enforcement officers are free to patrol the entire road without the need to wait at a gateway for long periods of time until a violator is detected. Enforcement coverage can also be effectively provided for all gateways with only a few officers.

BRIEF DESCRIPTION OF THE DRAWINGS

The foregoing features of this invention, as well as the invention itself, may be more fully understood from the following description of the drawings in which.

DETAILED DESCRIPTION OF THE INVENTION

Figure 1:
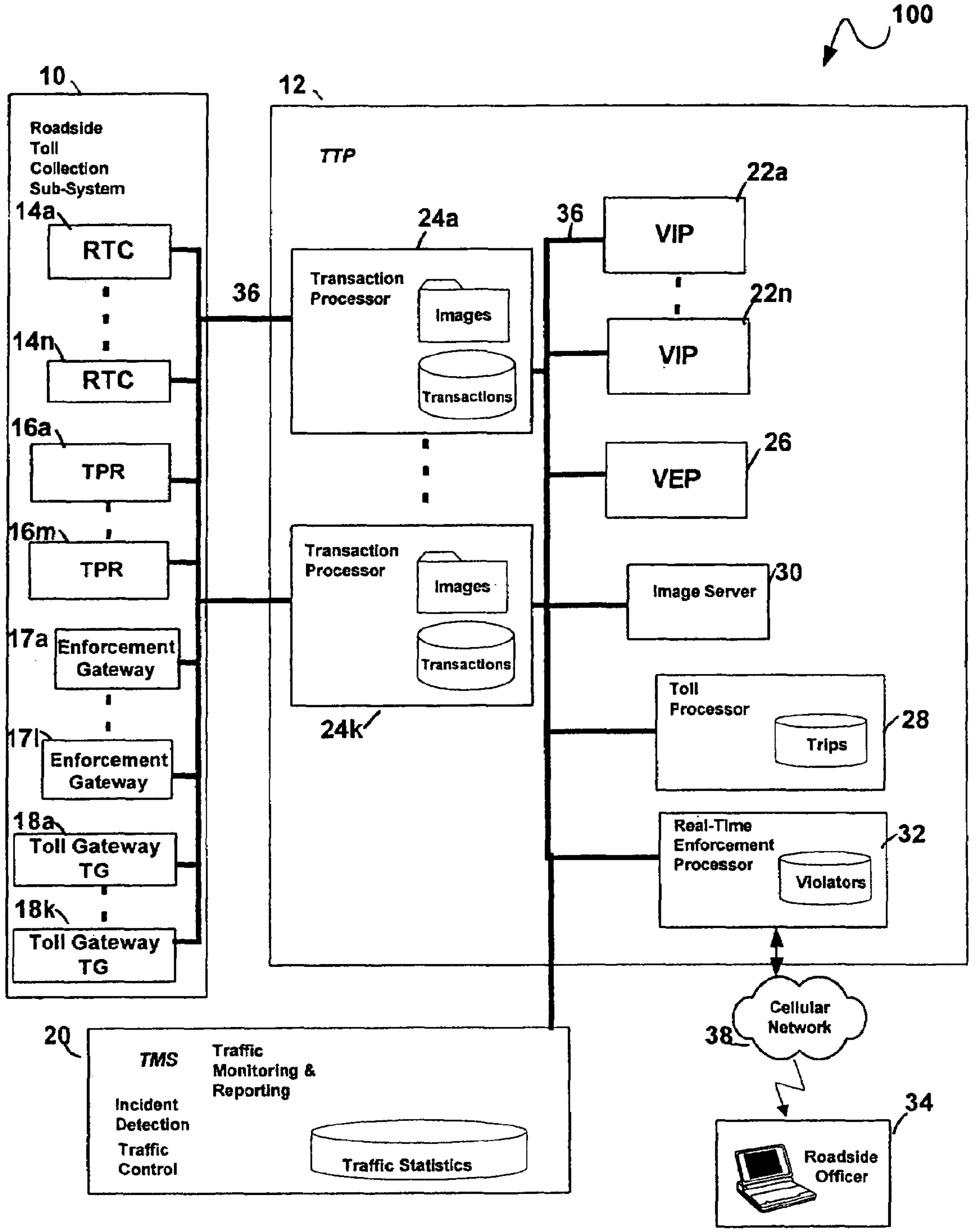
FIG. 1 is a schematic block diagram of an automatic roadway toll collection and management system according to the invention.

Before providing a detailed description of the invention, it may be helpful to define some of the terms used in the description. An automatic vehicle identification (AVI) reader is a device which reads unique transponders IDs. A transponder reading is associated with a license plate number in normal operation. Video image processing performed by a video image processor (VIP) includes but is not limited to automatically locating a license plate within an image, providing a sub-image which includes the license plate number, reading a license plate number using optical character recognition (OCR) techniques, matching license plate images using correlation techniques and other image processing methods. License plate images can be automatically processed by techniques including but not limited to optical character recognition and image matching techniques including correlation.

Video exception processing performed by a video exception processor (VEP) includes locating a license plate image, providing a sub-image and reading the license plate number from the sub-image manually. A sub-image is the portion of an image which includes the license plate and minimum background. The sub-image including the license plate field of view (FOV) can be provided using hardware which optically zooms in on the license plate, operator selection or by software image processing of a wider FOV image of the front end or back end portions of a vehicle. A registered plate (also referred to as a transponder registered license plate number) is a license plate associated with a vehicle and registered to a customer account for toll billing purposes.

A golden sub-image 66 is a saved historical image data item with a high probability of being correctly associated with a license plate number. The golden sub-image 66 (also referred to as a verified image) is verified by at least 2 reads, preferably one OCR read and one manual read. A set of golden sub-images 66 is maintained for a plurality of license plate numbers. Correlation Matching includes the process of automatically comparing the patterns of two or more sub-images, one of which is from the set of golden sub-images 66, using image processing techniques known in the art.

A Non-Final Plate Read is a processing condition indicating that a plate number has been read but may be subject to being re-read if it is later determined that there is a high probability the license plate number previously read is in error. A Final Plate Read is a processing condition indicating that a plate has been read with sufficient confidence so no further re-reads of the plate image are required. A Transaction is a record of a vehicle crossing a Toll Gateway or another point on the roadway where a record of the vehicle crossing the point can be recorded. A Trip is a complete journey on the Toll Road by an individual vehicle.

A transaction is a record of a vehicle crossing a toll gateway or other roadside device on the roadway where a record of the vehicle crossing the point can be recorded. A detection is provided by a trip processor processing a transaction or group of transactions to filter out duplicate transactions and certain ambiguous transactions.

Verification of license plate numbers includes confirming by manually reading a license plate image that an OCR reading or previous manual reading is correct. When required, an AVI reading can be confirmed by processing the plate image using the VIP or by manually reading the plate image.

Now referring to FIG. 1, an automatic roadway toll collection and management system 100 for a toll roadway includes a roadside toll collection subsystem 10 and a transaction and toll processing subsystem (TTP) 12 which are interconnected, for example, via a network 36. The roadside toll collection subsystem 10 includes a plurality of roadside toll collectors (RTC)14*a*-14*n* (generally referred to as RTC 14). Each RTC 14 is coupled to a plurality of traffic probe readers (TPR) 16*a*-16*m* (generally referred to as TPR 16), a plurality of enforcement gateways 17*a*-17*l* (generally referred to as enforcement gateway 17), and a plurality of toll gateways (TG) 18*a*-18*k* (generally referred to as TG 18) which are interconnected via the network 36. The TPRs 16, enforcement gateways 17, and TGs 18 are collectively referred to as roadside devices. The transaction and toll processing (TTP) subsystem 12 includes a plurality of transaction processors 24*a*-24*k* (generally referred to as transaction processor (TP) 24) coupled to an image server 30, at least one electronic plate reading video image processor (VIP) 22*a*, a manual plate reading subsystem 26 (also referred to as a video exception processor (VEP) 26), a toll processor 28, and a real-time enforcement processor 32. The system 100 optionally includes additional VIPs (shown as VIP 22*n*). The system 100 further includes a traffic monitoring and reporting subsystem (TMS) 20 which is connected to the roadside toll collection subsystem 10 and TTP 12 via the network 36. A roadside officer station 34, for example a laptop computer, can be connected via a wireless network 38 into network 36.

The blocks denoted "processors," "processor subsystems" or "sub-systems" can represent computer software instructions or groups of instructions. Portions of the RTC 14, can also be implemented using computer software instructions. Such processing may be performed by a single processing apparatus which may, for example, be provided as part of automatic roadway toll collection and management system.

In operation, the RTCs 14 control the collection of transaction data when a vehicle is detected. The transaction includes images and transaction data which are transmitted over the network 36 for processing by the plurality of transaction processors 24 included in the TTP 12. The transactions are further processed in order to provide data to the toll processor 28 for billing the customer for travel on the toll roadway. The toll processor 28 determines when a vehicle completes a trip which includes at least one transaction (described below in further detail in conjunction with FIG. 6). In one embodiment the images are stored on the image server 30. The license plate images can be distributed throughout the system 100.

A vehicle is detected, for example, when the vehicle crosses one of the TPRs 16, enforcement gateways 17 or TGs 18 on a roadway. After detection or simultaneous with the detection of the vehicle, a transponder reading is collected if possible. If the vehicle does not have a transponder, the transponder fails, or verification of the use of the transponder is required, a video image is collected. The image is initially processed by the RTC 14 and then transmitted to the image server 30. The image is processed automatically by one of the VIP processors 22 using OCR techniques or matching techniques, for example, correlation using a previously stored verified image or verified images of the vehicle's license plate. If the image cannot be processed automatically, then the image must be viewed manually by a human operator using the VEP processor 26 to determine the plate number. The system 100 attempts to reduce the number of manual operations as described below in conjunction with FIGS. 4-7. The real-time enforcement processor 32 determines information relating to law enforcement issues and distributes such information to law enforcement personnel.

The TMS 20 includes an incident detection system which provides information used to account for expected transactions which are overdue. In one embodiment the TPRs are used primarily to collect traffic information. This information can assist the system 100 in the determination of trips completed by vehicles traveling on the toll roadway system thus further reducing the number of manually read license plate images. The incident detection system can be of a type described in U.S. patent application Ser. No. 09/805,849, entitled Predictive Automatic Incident Detection Using Automatic Vehicle Identification filed Mar. 14, 2001, said patent application assigned to the assignee of the present invention, and incorporated herein by reference.

Figure 2:
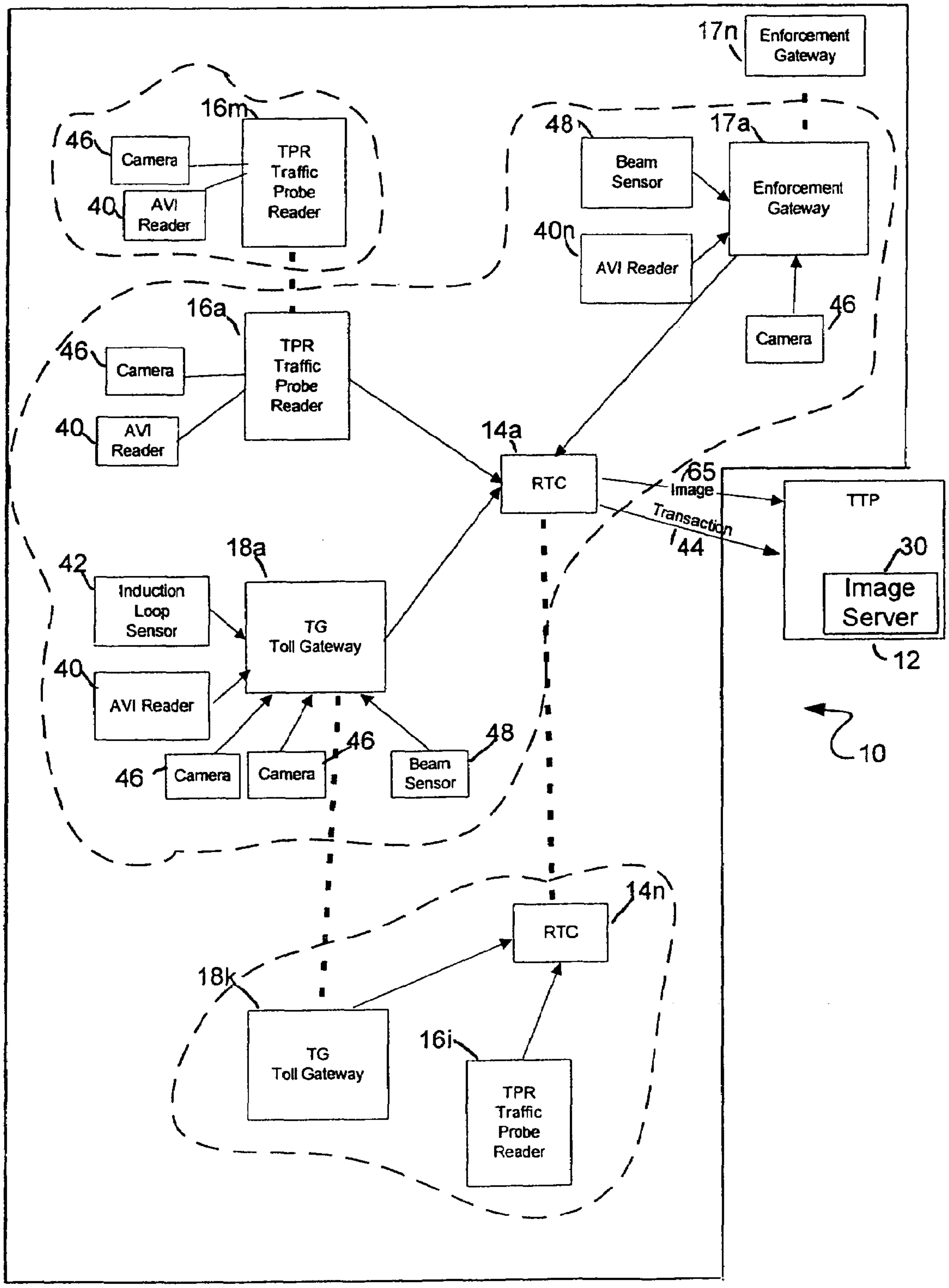
FIG. 2 is a block diagram of a roadside toll collection sub-system including roadside sensors according to the invention.

Referring now to FIG. 2 in which like reference numbers indicate like elements of FIG. 1, a block diagram of an exemplary roadside toll collection subsystem 10 configuration is shown. The roadside toll collection subsystem 10 includes a plurality of RTCs 14. Each RTC 14 controls roadside equipment including a plurality of TPRs 16 disposed at known intervals along the roadway, a plurality of TGs 18 disposed at known locations along the roadway, and a plurality of enforcement gateways 17 disposed at known fixed locations along the roadway. Enforcement gateways 17 are generally used when primary tolling is performed using another technology such as pre-paid passes or global positioning satellites (GPS). In an alternate embodiment, enforcement gateways 17 are mobile and disposed within the roadway and are for example in wireless communication with a corresponding RTC 14. Each RTC 14 controls a variable number of TPRs 16, TGs 18 and enforcement gateways 17, which are generally located in relatively close proximity to the controlling RTC 14.

In one embodiment, each TPR 16, enforcement gateway 17 and TG 18 includes an automatic vehicle identification (AVI) reader 40, and a video camera 46 and can optionally include a plurality of video cameras 46' for imaging the vehicle from a plurality of vantage points, for example, the front end of the vehicle. The TPRs 16, enforcement gateways 17 and TGs 18 are either directly connected to the controlling RTC 14 or can be connected via the network 36. The TGs 18 and enforcement gateways 17 are coupled to additional sensors including but not limited to induction loop sensors 42, and beam sensors 48. The induction loop sensor 42 is provided to detect the presence of a vehicle. The beam sensor 48, for example a laser beam, is provided to detect the height and width of a vehicle for classification purposes. The RTC 14 can optionally compress an image for transmission to the image server 30 (FIG. 1). It will be appreciated by those of ordinary skill in the art that other image capture devices such as a digital cameras may be used to capture and process the license plate image, and other sensors including but not limited to optical sensors, laser beams, infrared beams, heat sensors, and radar can be used for vehicle detection and classification. It should be appreciated that are a variety of possible RTC 14 and associated TPR 16, enforcement gateway 17, and TG 18 configurations to collect data in the automatic roadway toll collection and management system 100, and that various network configurations and data transmission protocols can be used to transfer data collected by the RTC 14 from the TPRs 16, enforcement gateways 17, and TGs 18.

The roadside toll collection subsystem 10 and AVI readers 40 can operate with several types of transponders including but not limited to transponders operating under a time division multiple access (TDMA) transponder standard ASTM V.6/PS111-98, the CEN 278 standard, or the Caltrans Title 21 standard. Each TG 18, enforcement gateway 17 and TPR 16 includes an AVI reader 40 capable of reading the unique ID assigned to each transponder 16. It should be appreciated that the incident detection system 100 can use a variety of transponders and AVI readers 40.

In operation, RTCs 14, in conjunction with TPRs 16, enforcement gateways 17 and TGs 18, are able to individually identify each vehicle which includes a transponder having a unique transponder identification code (ID). The novel approach described herein makes more use of the available AVI data than previously contemplated in conventional systems, for example, to form trips which include a plurality of transactions 44. AVI information is not used to chain trips if the information is suspect, for example if an In-Vehicle Unit (IVU), i.e., the physical transponder, is reported stolen. Alternate embodiments of the system 100 can include different criteria of a “suspect” AVI transaction according to the system 100 configuration and the billing policies.

In one embodiment, the roadside equipment, TPRs 16 and TGs 18, process each transponder’s (not shown) data to determine the following information which includes but is not limited to: (i) an indication with high confidence that the indicated transponder crossed the detection location in the expected direction of travel; (ii) the date and time of detection in Universal coordinated time (UTC); (iii) the difference in time from previous detection to current detection; (iv) the location of previous detection (this information is stored in the transponder memory); (v) the registered vehicle classification; (vi) the instantaneous vehicle speed collected at TG 18 ; (vii) an estimate of vehicle occupancy over the full-width of the roadway which is collected at TG 18 only and typically detected by overhead sensors, and (viii) the measured classification of the vehicle (generally only at the TG 18). In one embodiment, the system 100 operates using universal coordinated time (UTC) that is referenced to a single time zone. A roadway segment travel time, which is the difference in time between the time of a vehicle detections at the start and end of a roadway segment (not shown), is accurate to within ± one second. Additionally, TGs 18 can determine the count, speed, and occupancy of non-AVI vehicles which can be extrapolated to augment the AVI data produced by TPRs 16. It should be appreciated that the traffic monitoring and reporting sub-system (TMS) 20 can be used with an open-road automatic vehicle identification tolling instead of traditional toll booths, and that the system 100 is not limited to any specific toll collection method or roadway configuration. If the vehicle’s classification does not match the classification assigned to the transponder, the system 100 captures an image of the plate and determines the discrepancy to be a “class mismatch.” Then, the plate must be read with a high degree of accuracy to verify that a violation occurred because a large fine may be assessed by the roadway operator. The system 100 uses a trusted database of vehicle classifications, such as a department of motor vehicles (DMV). This technique does not protect against plate swapping, which is considered a law enforcement issue. In one embodiment, only one fine is assessed per month, so the system 100 discards some of the extra images up front to reduce workload on the VIP 22 and VEP 26. In another embodiment, the system verifies the classification manually and/or automatically using a rear or side image of the vehicle.

In one particular embodiment, the enforcement gateway 17 verifies that a vehicle has pre-paid a toll, that a vehicle is traveling according to a pre-arranged agreement (e.g., day pass), or that a vehicle is of the proper classification (car, truck, etc.) for the road or pre-arranged toll or agreement. In these situations, it is necessary to reliably read the vehicle license plate to match against operator or DMV records.

In addition to the AVI transponder data, license plate images are obtained for all non-AVI vehicles, AVI vehicles on the exception list, and AVI vehicles detected as a possible classification mismatch in order to verify the validity of the AVI data and to identify vehicles which are not equipped with a transponder. Typically the uniquely identified data, for example data associated with the vehicle, and other data such as a measured vehicle classification and license plate image data are transmitted over data network 36 which can include fiber optics, wireless transmission, or hard wired transmission lines. Each RTC 14 is coupled to a plurality of TG 18*s*, a plurality of TPRs 16, and a plurality of enforcement gateway 17. It will be appreciated by those of ordinary skill in the art, that the RTCs, TPRs 16, enforcement gateways 17 and TGs 18 can be interconnected with wireless communications to send and receive collected data.

Some government entities require a front license plate in addition to a rear license plate which can be recorded by one or more cameras positioned to capture an image of the front of a vehicle. Front end imaging is combined with rear end imaging where required by government regulations. In an alternate embodiment, front end imaging is used without rear end imaging.

Figure 3A:
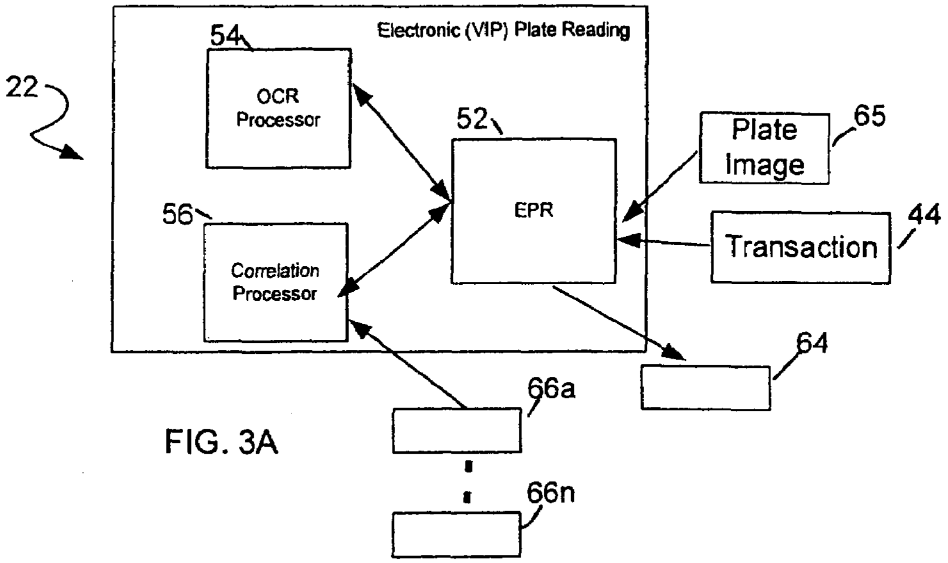
FIG. 3A is a block diagram of a video image processor (VIP) of the system of FIG. 1.

Referring now to FIG. 3A, a VIP processor 22 includes an OCR processor 54 and a correlation processor 56 coupled to an electronic plate reading processor (EPR) 52. The EPR 52 receives a license plate image 65 for each of a plurality of requests and a plurality of golden sub-images 66*a*-66*n*

(described below in conjunction with FIG. 7) (generally referred to as golden sub-images 66) and provides a VIP license plate number 64.

In operation the EPR 52 receives a plurality of request from the TPs 24*a*-24*k* including the transaction data and corresponding image. The transaction data is used, for example, to prioritize the tasks based on the transaction timestamp. The EPR 52 directs the transaction 44 and license plate image to either the OCR processor 54 or the correlation processor 56. In response to certain requests, the image is automatically processed by the OCR processor 54, the correlation processor 56 or both processors 54 and 56. The processing includes OCR on the license plate image and correlation with the golden sub-images 66 stored on image server 30 (FIG. 1). As a result of OCR and correlation processing, the EPR 52 provides a VIP license plate number 64 after processing license plate image.

In one embodiment, an individual VIP processor 22 includes a plurality of digital signal processors (DSP). In one embodiment VIP determined "feature data" is saved with each golden sub-image. Feature data is a stream of processed binary data stored and retrieved and supplied to the VIP for subsequent match attempts to speed up the match processing. With this arrangement the VIP processor 22 reduces the number of image processing steps required to correlate the sub-image with a verified image. In alternate embodiments, other plate correlation processors 56 may or may not save feature data to accelerate the matching process.

In one embodiment, the EPR 52 tasks are implemented on the TPs 24 and the toll processor 28. It will be appreciated by those of ordinary skill in the art that the EPR 52 can include distributed processing tasks running on the plurality of TPs 24*a*-24*k*, on the toll processor 28, and on a separate processor in the VIP 22.

Figure 3B:
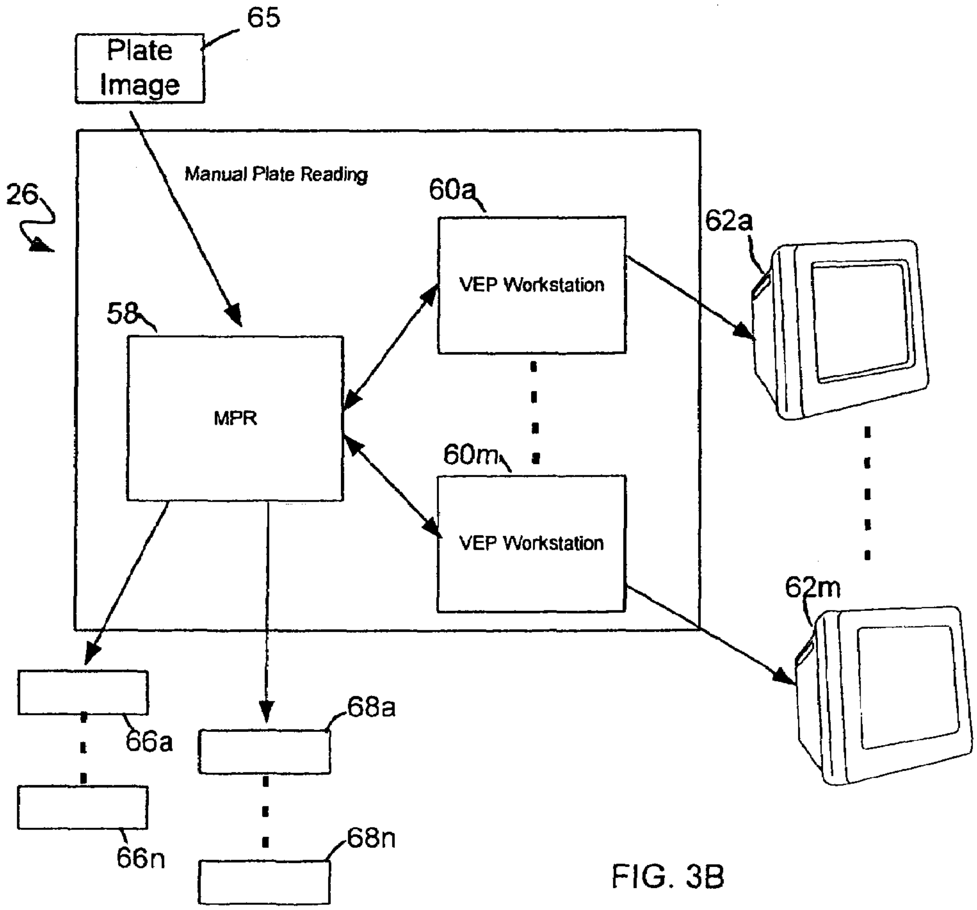
FIG. 3B is a block diagram of a video exception processor (VEP) of the system of FIG. 1.

Referring now to FIG. 3B, a VEP processor 26 includes a plurality of manual plate reading VEP workstations 60*a*-60*m* coupled to a manual plate reading processor (MPR) 58. The VEP workstations 60*a*-60*m* are coupled to respective MPR monitors 62*a*-62*m*. The MPR 58 receives a license plate image 65 for each verification request. The VEP workstations 60 and the MPR 58 are coupled to the network 36 (FIG. 1) to handle requests from the TPs 24 (FIG. 1) or toll processor 28 (FIG. 1) and to provide a plurality of VEP license plate numbers 68*a*-68*n* (generally referred to as VEP plate numbers 68) and to provide the plurality of golden sub-images 66*a*-66*n* which are used in conjunction with the correlation processors 56.

The MPR processor assigns the tasks to the VEP workstations 60 and processes the results. After receiving a request to read a license plate image, the workstation 60 retrieves and displays the image to be processed. Operators view license plate number appearing on the MPR monitor 62 of the respective VEP workstation 60 and enter the VEP plate number 68 if the image is readable. When the image readability is low, the image is read multiple times by different operators, and the system 100 determines whether there is any agreement among the different readings (as described below in further detail in conjunction with FIGS. 5A-5B). In one embodiment, the MPR processor 58 tasks are implemented on the toll processor 28. It will be appreciated by those of ordinary skill in the art that the MPR processor 58 can include distributed processing tasks running on the plurality of TPs 24*a*-24*k*, on the toll processor 28, and on a separate processor in the VEP 26.

Referring now to FIGS. 4-7, flow diagrams illustrate the steps for processing a transaction 44 (FIG. 2) including reading license plates. A reduction in license plate read errors is obtained by combining a process for maintaining and applying a set of verified images (also referred to as golden images, golden sub-images 66, and historical plate images) using a correlation processor (described in conjunction with FIGS. 4 and 7), to achieve error reduction, and a process for selecting which plate images should be read/re-read by an operator to minimize plate read errors without incurring substantial additional operational cost by considering information related to the current vehicle. The automatic roadway toll collection and management system 100 includes functional capabilities including but not limited to transaction formation, plate reading, trip formation, billing and violation processing. These capabilities are described below in conjunction with FIGS. 4-7.

In the flow diagrams of FIGS. 4-7, the rectangular elements are herein denoted "processing blocks" (typified by element 200 in FIG. 4) and represent computer software instructions or groups of instructions. The diamond shaped elements in the flow diagrams are herein denoted "decision blocks" (typified by element 204 in FIG. 4) and represent computer software instructions or groups of instructions which affect the operation of the processing blocks. Alternatively, the processing blocks represent steps performed by functionally equivalent circuits such as a digital signal processor circuit or an application specific integrated circuit (ASIC). It will be appreciated by those of ordinary skill in the art that some of the steps described in the flow diagrams may be implemented via computer software while others may be implemented in a different manner (e.g. via an empirical procedure). The flow diagrams do not depict the syntax of any particular programming language. Rather, the flow diagrams illustrate the functional information used to generate computer software to perform the required processing. It should be noted that many routine program elements, such as initialization of loops and variables and the use of temporary variables, are not shown. It will be appreciated by those of ordinary skill in the art that unless otherwise indicated herein, the particular sequence of steps described is illustrative only and can be varied without departing from the spirit of the invention.

Figure 4:
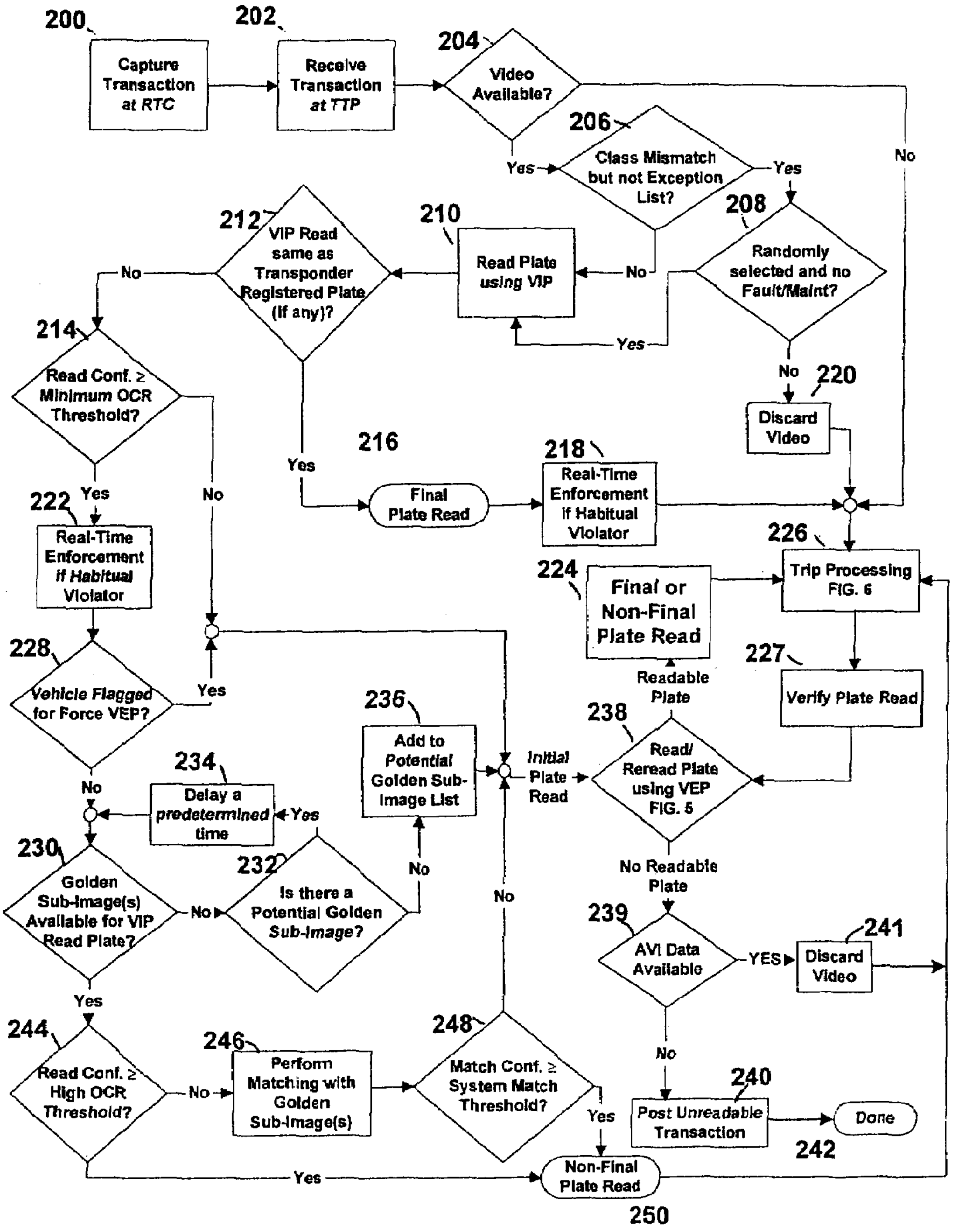
FIG. 4 is a flow diagram illustrating the steps of processing license plate images automatically using a VIP according to the invention.

Referring now to FIG. 4, a flow diagram illustrates processing of a vehicle transaction 44 (FIG. 2). Processing is initiated at step 200 by capturing a transaction 44 at one of the RTCs 14 or other transaction collection gateways. A transaction 44 preferably includes the location of the RTC 14, a universal time stamp, an image of the license plate if available, and the transponder ID of the vehicle if available. Processing continues at step 202.

At step 202, the transaction 44 is received at the transaction and toll processing subsystem TTP 12 (FIG. 1). The transaction 44 is distributed to one or more transaction processors 24. Processing continues at step 204.

At step 204, it is determined whether a video image of the vehicle license plate is available for the current transaction 44 being processed. Video is available, for example, when a license plate image is captured because no transponder reading was. available, a transponder was reported lost or stolen, the transponder ID and associated customer/vehicle ID number is on an exception list, or required by the roadway operator for additional customer specific reasons. In one embodiment, the RTCs 14 and the roadside toll collection sub-system 10 (FIG. 1) determine when a license plate image is required and the image is captured and made available for further automatic and manual processing. The RTC 14 determines, for example, that an image is required by detecting the absence of a transponder signal, detecting a vehicle class mismatch, determining that the detected transponder is on an exception list, or in response to a random audit or maintenance requirements. The absence of a transponder signal is caused, for example, by a transponder failure, AVI equipment failure, or AVI equipment maintenance. The exception list is a mechanism for tracking all transponders that are lost, stolen, subject to audit, or required by the roadway operator for additional customer specific reasons. Auditing includes customer auditing in which random transponders are places on the exception list to capture their plate number using images and verifying that the plate number is the same as the associated registered plate number, and system performance auditing in which images are read or reread manually to verify that the OCR, correlation or prior manual read was correct. System performance auditing increases the reliability of the system 100. The RTC 14 can make a local decision to capture an image or it can communicate with other sub-systems or processors to make the determination. It will be appreciated by those of ordinary skill in the art that other sub-systems or processors can determine when the plate image is required and that the RTC 14 can attempt to capture the plate image every time a vehicle is detected. If no video is available, processing continues at step 226 to determine whether the current transaction 44 is part of a trip. If the video image is available, processing continues at step 206.

At step 206, it is determined if class mismatch exists. A class or classification represents a vehicle type, for example a motorcycle, car, pickup truck, tractor trailer, multi-trailer truck. In one embodiment, a class mismatch is detected by comparing the class assigned to an In-Vehicle Unit (IVU), for example a physical transponder, with a measured class from a roadside device. If a class mismatch occurs and the vehicle is not on an exception list, the processing continues at step 208, otherwise processing continues at step 210. The exception list includes a list of IVUs where a video image is needed to verify that the IVU transponder reading matches the license plate of the vehicle. This list is used for example when an IVU is stolen or where mail to the customer associated with the IVU is returned.

At step 208, video that was captured as the result of a class mismatch is processed. It is determined whether the Fault/Maintenance status indicates that an RTC device was in a degraded state or undergoing maintenance when the roadside device detected the vehicle, thus the class mismatch is of low confidence and the video should be discarded. Furthermore, it is determined whether high confidence class mismatch video should be discarded to reduce load on the system since in some cases little or no additional revenue is generated from repeated classification violations. In one embodiment, a tunable parameter indicates what percentage of high confidence class mismatch images should be discarded. Alternatively, the decision to discard video images is based on the actual violation history for each customer account. The optimal process for discarding images is dependent on the operational procedures governing a given roadway. Discarding unneeded violation images reduces the load on the VIP 22 and the VEP 26 processors and reduces the number of manual reads. If a fault or maintenance activity has occurred, or the video images are selected to be discarded, the video images are discarded at step 220, otherwise processing continues at step 210.

At step 210, the video image processor VIP processes the license plate image preferably using optical character recognition (OCR) to transform the plate image into an alphanumerical plate number. The OCR process produces a read confidence value to indicate the accuracy of the recognition process. The plate number read automatically by the VIP subsystem 22 (FIG. 1) is referred to as the VIP plate number 64 (FIG. 3A). Processing continues at step 212.

At step 212, it is determined if the VIP license plate number is identical to the license plate number registered with the transponder ID if the transponder ID is available. If the registered plate number is not available or does not match the VIP license plate number processing continues at step 214, otherwise the plate read is considered final at step 216.

At step 214, the read confidence value is compared to a predetermined minimum OCR threshold. If the read confidence value is greater than or equal to the predetermined minimum OCR threshold processing continues at step 222. If the read confidence value is less than the predetermined minimum OCR threshold, processing continues at step 238 to have the plate image read manually.

At step 216, the plate read is marked as final, the VIP read plate number is considered a final plate read and the VIP plate number is processed as the plate number by the toll transaction processor and processing continues at step 218.

At step 218, real-time enforcement is affected if the vehicle is indicated as an "habitual violator." The plate characters are compared against a pre-determined list of violators subject to law enforcement action. The criteria for determining the predetermined list varies according to the laws governing each road. In one embodiment, only customers who habitually use the road without paying their bill are subject to enforcement. If the plate characters are found on the list of violators, an immediate alert is sent to all available law enforcement officers. The alert is automatically displayed to the officers indicating the time and location that the violator was detected and the vehicle description which is verified from previous images at the time the violator is added to the violator list. Using this information, the nearest officer intercept the violator while the violator is still on the road. In the event the violator crosses additional gateways before being intercepted, an updated report is sent to the officers to give them a more accurate location of the vehicle. Processing continues at step 226.

At step 220, the plate image for the current transaction 44 is discarded and processing continues with trip processing step 226 (FIG. 6) using the AVI portion of the transaction 44.

At step 222, real-time enforcement is affected as in step 218 if the vehicle is indicated as an "Habitual Violator" and processing continues at step 228.

At step 224, processing returns from any final or non-final plate read operation, and processing continues at step 226 to determine if the current transaction 44 can be chained with other transactions to form a trip.

Figure 6:
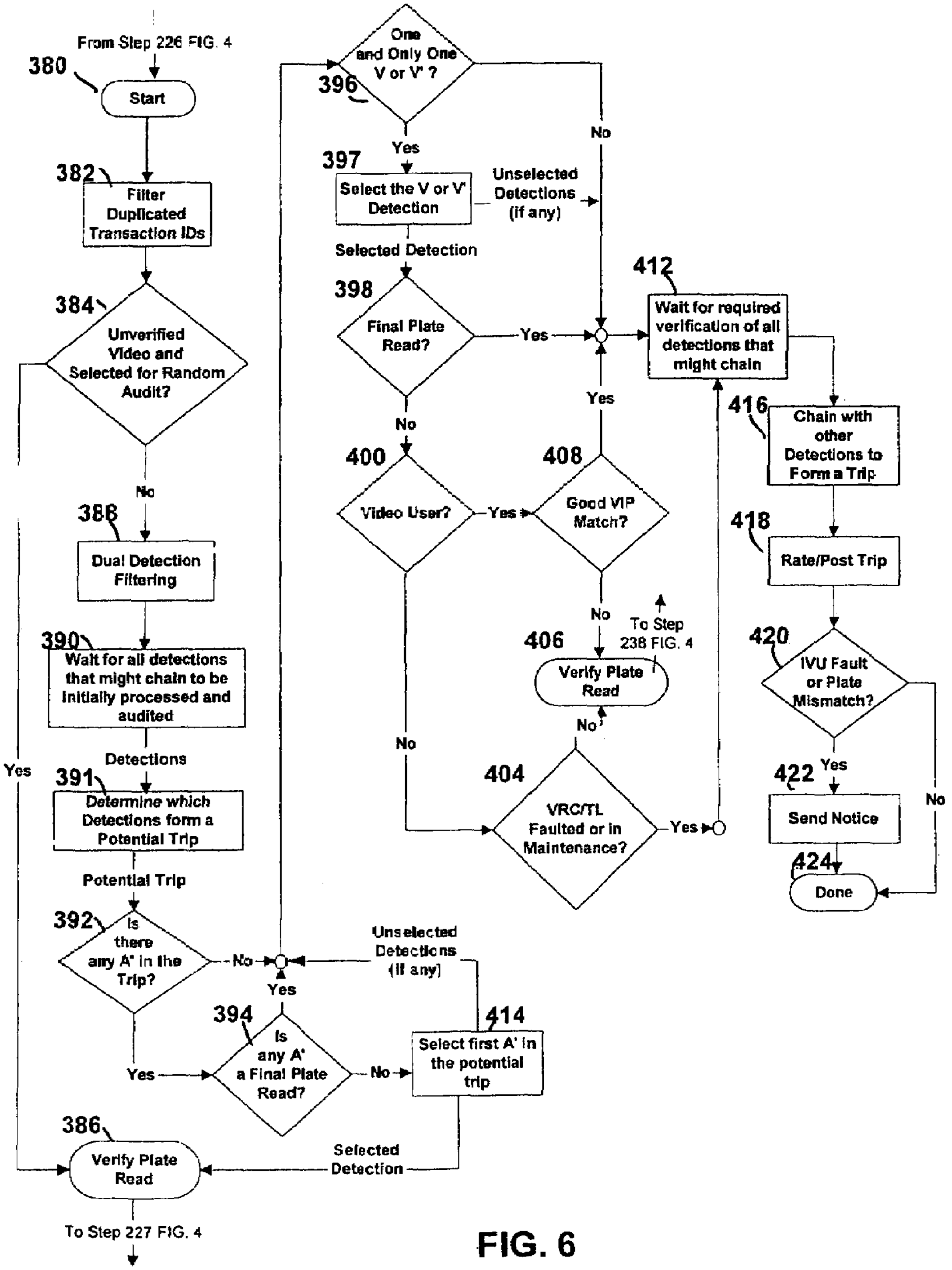
FIG. 6 is a flow diagram illustrating the steps of trip determination processing to reduce license plate read errors according to the invention.

At step 226, processing continues with trip processing (described in conjunction with FIG. 6). The process for trip determination can be of a type described in U.S. patent application Ser. No. 10/058,591, entitled "Vehicle Trip Determination System And Method" filed Jan. 28, 2002, said patent application assigned to the assignee of the present invention, and incorporated herein by reference.

At step 227, processing continues after trip processing where a verified plate read is requested and processing continues at step 238. A transaction 44 traverses step 227 to step 238 only once before reaching step 224.

At step 228, if the vehicle as identified by the transponder ID or the VIP license plate number is flagged to force a VEP read, processing continues at step 238 to have the plate image read manually, otherwise, the processing continues at step 230.

At step 230, if one or more golden sub-images 66 are available for VIP matching number, processing continues at step 244, otherwise processing continues at step 232 to check for a potential golden sub-image 66 to update the set of verified images.

Figure 5A:
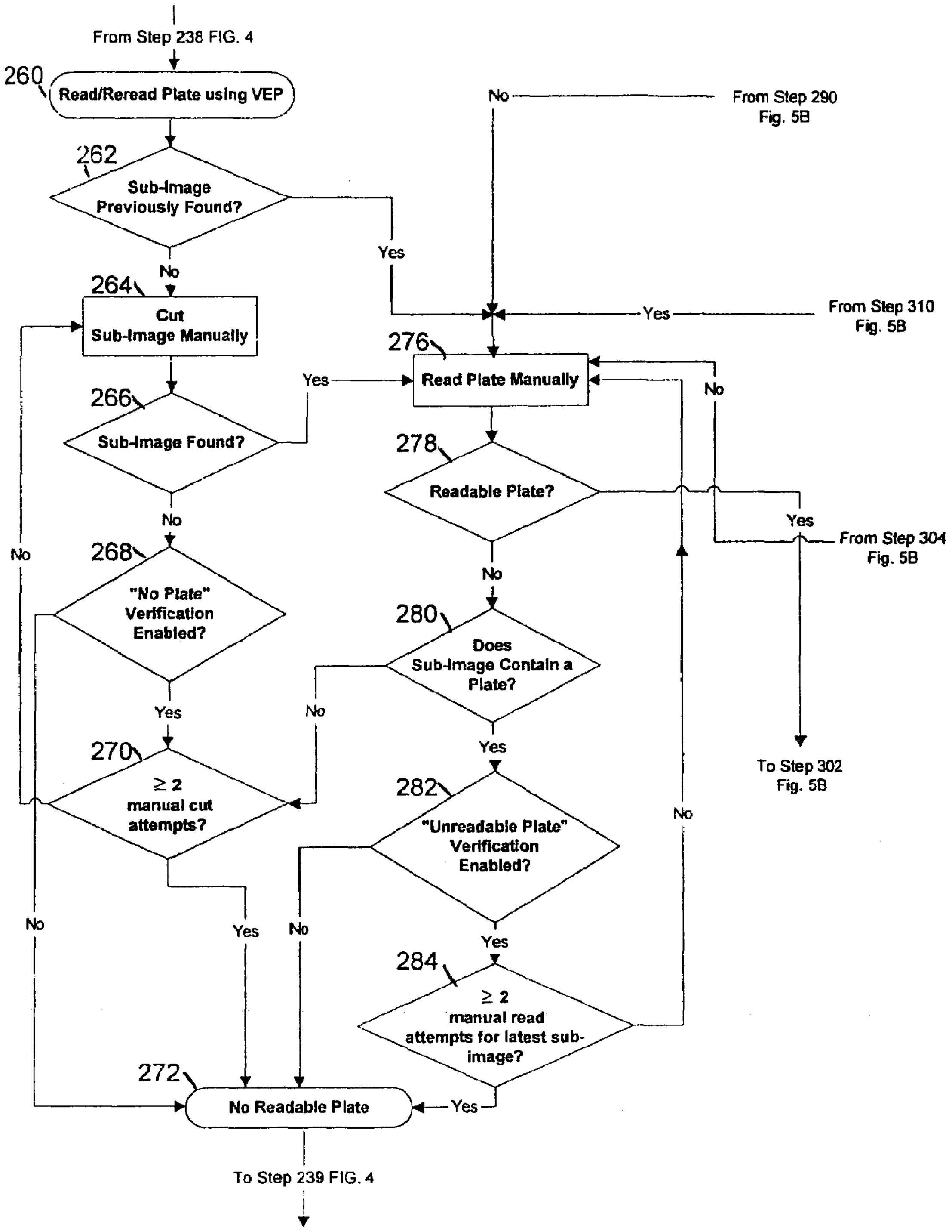
FIGS. 5A-5B is a flow diagram illustrating the steps of reading license plate images manually using a VEP according to the invention.
Figure 5B:
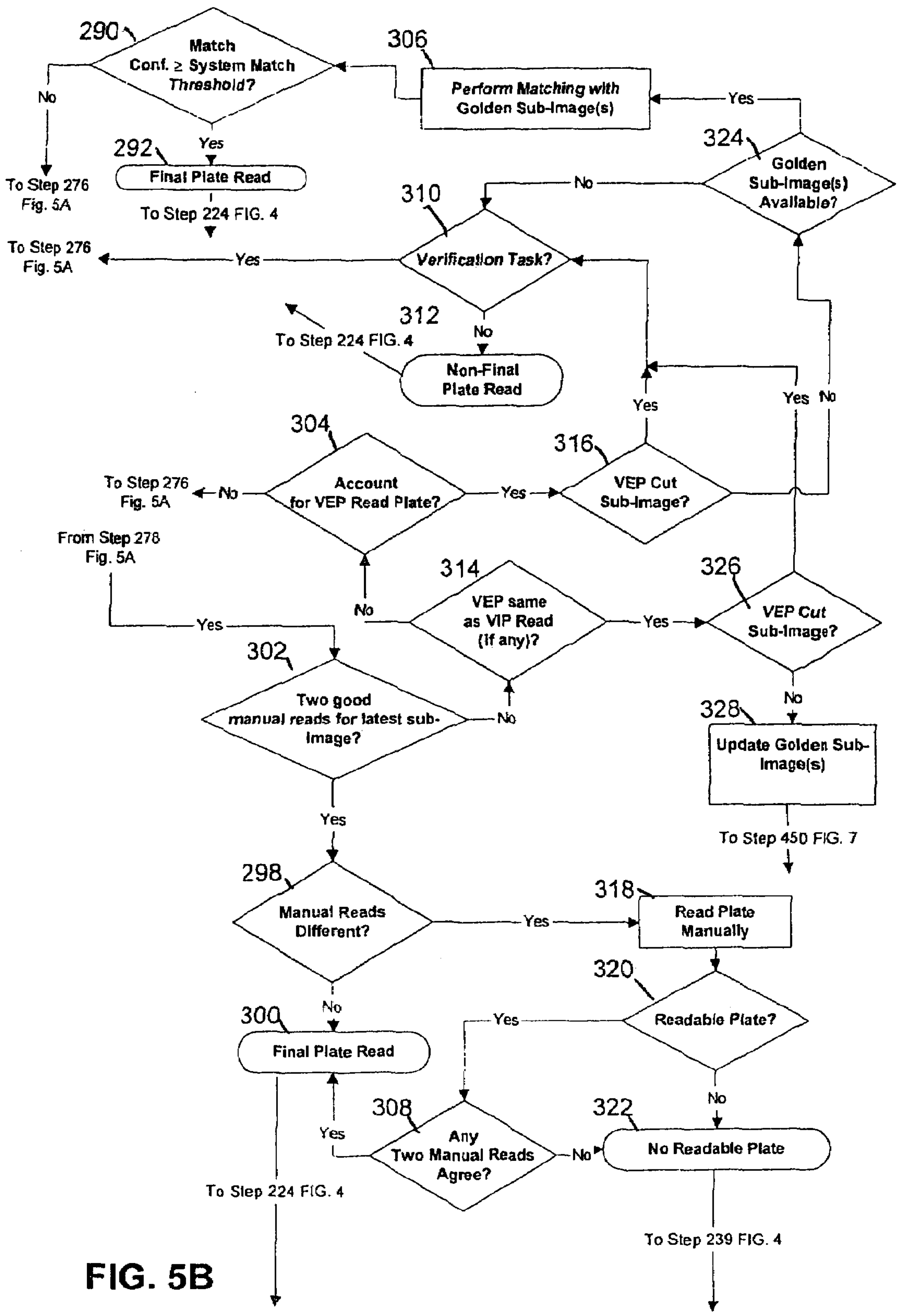

At step 232, it is determined whether there is a potential golden sub-image. The list of potential golden sub-images 66 is built in step 236. The list of potential golden sub-images 66 is purged (not shown) when the processing steps of FIGS. 5A-5B are completed. If it is determined that there is a potential golden sub-image 66 processing continues at step 234, otherwise processing continues at step 236.

At step 234, a delay for a predetermined time occurs, for example, the system can delay for approximately one hour in order to determine if a golden sub-image 66 has become available.

At step 238, processing continues with the plate image being read using the VEP processor (as described in conjunction with FIGS. 5A-5B). This step is reached on an initial manual read of the license plate image or if trip processing (step 226) requests that a plate read be verified. If it is determined that the VEP process cannot read the plate image processing continues at step 239. If it is determined that the VEP process can read the plate image processing continues at step 224.

At step 239, after determining that there is no manually readable plate, it is determined whether there is AVI data available. At step 239, there may or may not have been a plate number returned by the VIP 22 (OCR or correlation matching). If there is AVI data available from a prior transponder reading, processing continues at step 241, otherwise processing continues at step 240.

At step 240, the transaction 44 is posted as unreadable and processing continues at step 242. In one embodiment, the transaction 44 is posted to a billing system for auditing purposes.

At step 241, the plate image for the current transaction 44 is discarded and processing continues with trip processing step 226 (FIG. 6). using the AVI portion of the transaction 44.

At step 242, processing terminates for the current transaction 44.

At step 244, the read confidence value is compared to a predetermined high OCR threshold. If the read confidence value is greater than or equal to the predetermined high OCR threshold processing continues at step 250 where the VIP read plate number 64 is considered a non-final plate read. If the read confidence value is less than the predetermined high OCR threshold processing continues at step 246 to perform matching with golden sub-images 66 (FIG. 3A). The golden sub-images 66 are license plate images which have been verified to correspond to a known license plate number.

At step 246, the video image processor (VIP) processes the license plate image preferably using image correlation to match the license plate image with previously stored golden sub-image(s) related to the VIP Read Plate number referred. A commercially available pattern matcher such as a PULNiX America Inc. Model Number: VIP Computer, Part Number: 10-4016, is preferably used for matching the license plate image with one of a set of previously stored golden sub-images 66. In order to achieve better performance under varying environmental conditions, the VIP attempts to match against multiple golden sub-images 66 and uses the highest confidence found. The golden sub-image replacement technique (described in more detail in conjunction with FIG. 7) is an important feature for efficiently using image matching to reduce the error rate and minimize the number of manual reads. This step provides a check on the OCR of the image being processed, and as such reduces the license plate read error rate because OCR errors will be detected and resolved by the VEP before incorrect billing information is posted to a customer account. It will be appreciated by those of ordinary skill in the art that other techniques can be used to provide a set of verified images to use for matching purposes and that other pattern matching techniques can be used. The correlation process produces a match confidence value to indicate the accuracy of the correlation process. Processing continues at step 248.

At step 248, the highest match confidence value obtained in step 246 is compared to a predetermined system match threshold. If the highest match confidence value is greater than or equal to the predetermined system match threshold processing continues at step 250 where the VIP read plate number is considered a non-final plate read. If the highest match confidence value is less than the predetermined system match threshold processing continues at step 238 where the plate image is read manually.

At step 250, the VIP Read Plate number is considered a non-final plate read and additional attempts are made to obtain an accurate license plate number and processing continues at step 226 to determine whether the current transaction 44 is part of a trip. This check is performed before an initial manual read is requested. Trip processing at step 226 can eliminate initial plate manual reads, in particular images processed at steps 216 and 250 bypass the initial manual read at step 238 and are initially processed through trip processing.

Referring now to FIGS. 5A-5B, a flow diagram illustrates the steps of manually reading or rereading a license plate image. VEP processing of a plate image is initiated at step 260. As a result of VEP processing, a new golden sub-image 66 may be produced as shown in step 328. With some plate images, several manual reads are required and a voting approach is used as described in conjunction with steps 298, 300, 308, 318, 320, and 322. Correlation, i.e. matching with golden sub-images 66, is used in VEP processing as described in conjunction with steps 290, 292, 306, 316, and 324 to further reduce the number of manual reads At step 262, it is determined if a sub-image from previous VIP or VEP read steps is available for reading. If a sub-image was previously found in the license plate image 65, processing continues at step 276, otherwise processing continues at step 264 to provide a sub-image.

At step 264, a sub-image is manually cut from the original license plate image 65 (FIG. 2) captured by the RTC 14 at the time of the transaction 44. The sub-image can be reduced up to approximately two percent of the license plate image 65 in order to narrow the field of view (FOV) and to reduce image storage requirements without losing information. In one embodiment, the full image is stored with high compression but the sub-image which includes the image of the license plate is stored uncompressed, or compressed with low loss techniques. This storage method allows for only the sub-image to be zoomed and enhanced for improved manual read accuracy. Processing continues at step 266.

At step 266, if it is determined that a sub-image is found the plate is read manually by an operator at step 276, otherwise processing continues at step 268.

At step 268, if the no plate verification condition is enabled processing continues at step 270, otherwise VEP processing terminates at step 272 with no readable plate. No Plate Verification is a switchable processing condition set according to the current business policies of the road operator. By selecting the no plate verification condition, a trade-off is made between error reduction and higher operator workload.

At step 270, if there have been two or more attempts at manually cutting the license plate number sub-image from the license plate image, i.e. two manual cuts at step 264, processing terminates at step 272, otherwise plate image processing attempts to cut another sub-image manually. Processing continues with a second manual read attempt routed to a different operator who may have a different opinion or at least not make the reading error, at step 264.

At step 272 a determination has been made that the current transaction 44 includes no manually readable plate, for example, if the vehicle has no plate or the detection sensors have been triggered by a non-vehicle object. The VEP 26 (FIG. 3B) returns this determination at step 239 (FIG. 4). The transactions 44 processed at step 272 do not continue to trip processing (unless there is also AVI data available) as there is no plate number to be chained to a trip.

At step 276, an operator attempts to read a plate manually using the VEP 26. In one embodiment multiple VEP operators read images at VEP workstations and perform the manual steps described in FIGS. 5A-5B. The operator first makes a determination as to whether the plate is readable in step 278.

At step 278, if the plate image is readable, processing continues at step 302, otherwise processing continues at step 280. The plate number read by the operator is referred to as the VEP plate number 68 (FIG. 3B).

At step 280, if the sub-image does not include a plate number, processing continues at step 270 otherwise processing continues at step 282.

At step 282 if the Unreadable Plate Verification condition is enabled, processing continues at step 284, otherwise processing terminates at step 272. The Unreadable Plate Verification condition is a switchable processing condition set according to the current business rules of the road operator. By selecting the condition a trade-off is made between error reduction and higher operator workload. This condition is used to minimize the number of manual reads under certain operating conditions.

At step 284, if there have been two or more attempts at manually reading the license plate number sub-image, i.e. two manual reads at step 276 without processing at step 270, VEP processing terminates at step 272, otherwise the same sub-image is sent to a different operator for reading at step 276.

At step 302, if there have been two good manual reads for latest sub-image, i.e. two manual reads at step 276 without processing at step 270, processing continues at step 298, otherwise processing continues at step 314. Two manual reads occur, for example, when an initial manual read of a single gateway video trip requires verification or a prior manual read is followed by a second read resulting from steps 304, 310 and 290.

At step 298, the manual reads are compared, and if the manual reads are different the plate is read manually at step 318 using a different operator than the first two reads, otherwise the plate read is considered final for the current transaction 44 at step 300.

At step 300, the VEP Read Plate number is considered a Final Plate Read and the VEP plate number is processed as the plate number by the toll transaction processor and processing returns to step 224 (FIG. 4).

At step 314, if the VEP plate number 68 is the same as VIP plate number 64, if a VIP plate number exists, then processing continues at step 326, otherwise processing continues at step 304.

At step 304, if the VEP plate number 68 (FIG. 3B) is registered in the system 100, processing continues at step 316. Registered Plates are those associated with existing AVI and Video User Accounts, otherwise processing continues at step 276 to have the plate image read manually because unregistered plates include a lower confidence level.

At step 316, a determination is made whether the image associated with the transaction being processed has been manually cut at step 264. If the image has been cut (i.e. a VEP cut sub-image) processing continues at step 310, otherwise processing continues at step 324.

At step 324, if a golden sub-image 66 or images are available, VEP read plate number processing continues at step 306, otherwise processing continues at step 310 where the VEP plate number 68 is considered a non-final plate read.

At step 306, the VIP 22 processes the license plate image preferably using image correlation to match the license plate image with previously stored image golden sub-image(s) related to the VIP Read Plate number referred. This step provides a check on the manual read of the image being processed, and as such reduces the manual read error rate and allows the manual read operators to effectively manually read plates at higher rates because errors will be detected before incorrect billing information is posted to a customer account. The correlation process produces a match confidence value to indicate the accuracy of the correlation process and processing continues at step 290.

At step 308, a determination is made if any two manual reads agree on the same license plate number. At this step there are three manual reads for the latest sub-image. If it is determined that the resulting plate numbers of any two manual reads match, processing continues at step 300, otherwise processing continues at step 322.

At step 310, a determination is made as to whether the current processing task is a verification task, i.e. whether the current processing tack resulted from a trip processing step. If the current task is not a verification task processing continues at step 312. Otherwise processing continues at step 276.

At step 312, the VEP plate number 68 is considered a Non-Final Plate Read and processing resumes at step 224 (FIG. 4).

At step 290, the highest match confidence value is compared to a predetermined system match threshold. If the match confidence value is greater than or equal to the predetermined system match threshold processing continues at step 292 where the VEP Plate number is considered a final plate read. If the highest match confidence value is less than the predetermined system match threshold processing continues at step 276 to have the plate image reread manually to attempt to obtain an accurate license plate number.

At step 292, the VEP Plate number is considered a final plate read and processing returns to step 224 (FIG. 4).

At step 318, a different current operator from two operators who have already read the sub-image, attempts to "reread" the plate. The system 100 considers this operation a re-read, but the current operator has never seen the sub-image before. The current operator first makes a determination as to whether the plate is readable in step 320.

At step 320, if the plate image is readable, processing continues at step 308, otherwise processing continues at step 322.

At step 322 a determination has been made that the current transaction 44 includes no manually readable plate. This can occur for example when there is an ambiguous or obstructed plate and the VEP process returns this determination at step 239 (FIG. 4).

At step 326, a determination is made whether the image associated with the transaction being processed has been manually cut at step 264. If the image has been cut (i.e. a VEP cut sub-image) processing continues at step 310, otherwise processing continues at step 328.

Figure 7:
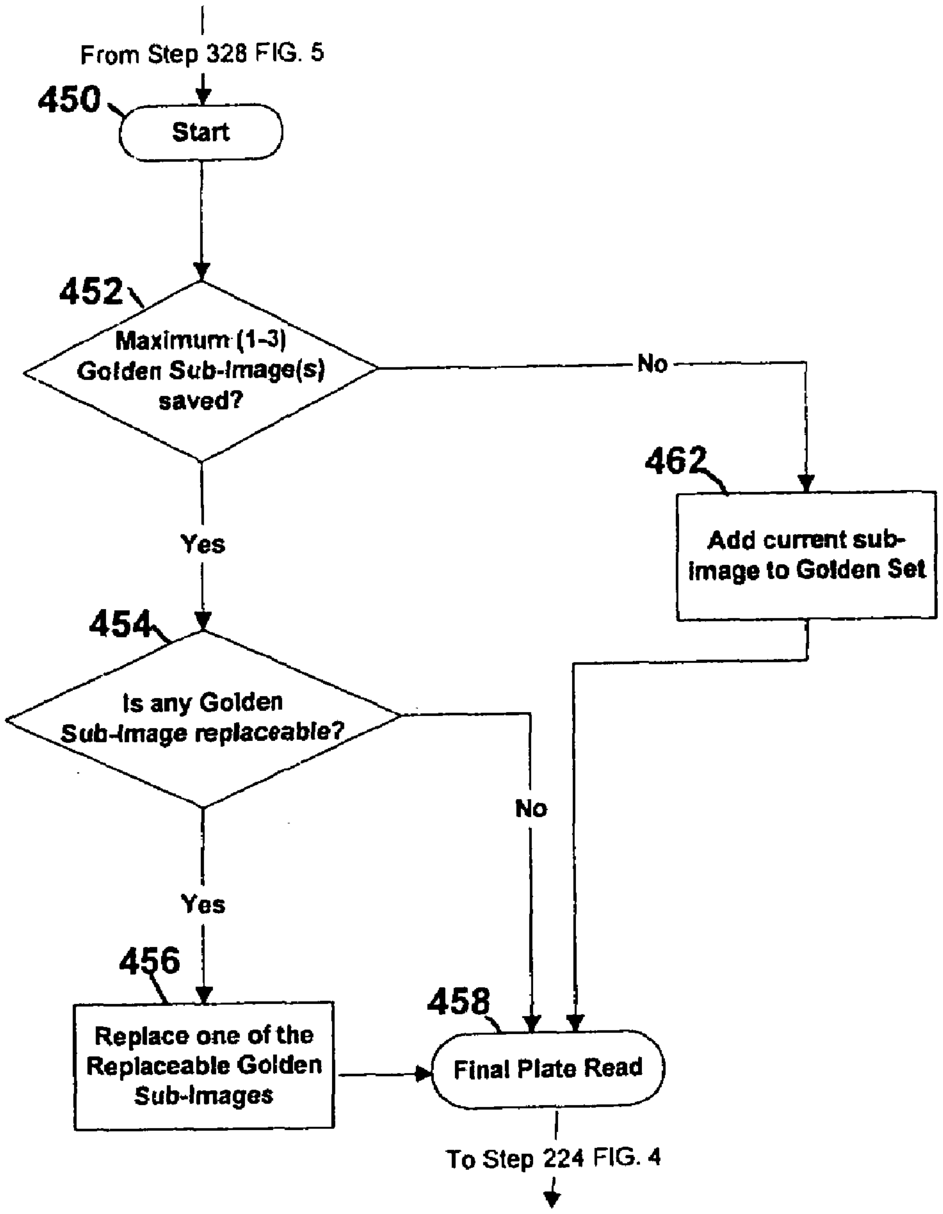
FIG. 7 is a flow diagram illustrating the steps of updating a "golden" (verified) image according to the invention.

At step 328, the VIP cut sub-image is used to potentially update the set of golden sub-images 66 at step 450 (FIG. 7).

Referring now to FIG. 6, at step 380 processing commences to determine if any additional detections which form a trip taken by an individual vehicle add information which is useful in determining and verifying the plate number of the vehicle. For example, if the same plate number is read at two consecutive TGs 18 and the transit time between the two TGs 18 was reasonable for current traffic conditions, there is a relatively high confidence that the plate number is correct. License plate images are generally included in the detections when the RTC 14 determines the images are required, and the inclusion of the image can result in a manual read operation. The consecutive reads described above, for example, provide a reduction in the number of manual reads because, here, no manual read would be required for verification purposes for the two detections even if the detections included video images. In one embodiment, in which the system 100 includes a high percentage of vehicles equipped with transponders, the majority of the transactions and resulting detections with include only AVI readings and under normal circumstances no verification of these AVI readings will be required. Table I illustrates four different types of detection categories used for trip processing and used in conjunction with FIG. 6. A detection is result of processing one or more transactions and represents the actual event of a vehicle being detected by the roadside devices. Although most detections do not require verification, there are several situation where video images are required and made available to the trip determination subsystem 40. In systems with a relatively lower percentage of AVI readings and systems which rely to a greater extent on video capture a relatively larger number of verifications is required. A vehicle ID is a unique number assigned to each vehicle identified by the system. The vehicle ID is associated with a license plate number (also referred to as plate characters).

For example, an "A" detection includes have only a transponder reading. The "A" type detection is the normal detection in the case of a transponder user where there are no hardware problems, no class mismatch, and no reported problems with the customer account associated with the AVI reading. An A' detection is, for example, a detection that might indicate that a customer has switched a transponder from one vehicle to another without authorization, and the system 100 has determined that video images are required to determine which vehicle actually is using the transponder. In both the A and A', detections, the IVU ID is used to determine the Vehicle ID.

The V' detection is, for example, a detection also including a video image with a transponder reading, but might be used when a transponder has been reported stolen. In this situation, the transponder is likely to be on a different vehicle than the one identified by the Vehicle ID registered to the transponder so the system 100 will try to read the plate image to determine the license plate number. It is important to verify at least one of the A' and V' detections, and in many situations this will involve manual reads using the VEP 26.

TABLE I

| | Detection Types | |
|---|---|---|
| | Components | Source of Vehicle ID |
| A | AVI Only | IVU ID |
| A' | AVI + Video | IVU ID |
| V | Video Only | Plate Characters |
| V' | Video + AVI | Plate Characters |

The Vehicle ID is normally derived from the IVU ID when a detection has both AVI and Video components. The specific conditions under which the Vehicle ID is derived depend on the roadway operator's policy.

Additional manual reads, can result from verification requested by the trip processor described below in steps 380 to 424. Verifications place a load on the manual read sub-system which also must process images for which there is no other means of identification. A reduction in the number of verifications reduces the overall number of required manual reads. An example of a required verification occurs when the system discovers a vehicle class mismatch. This might occur when a transponder is moved from a car to a truck. The system will detect this situation and capture a video image of the license plate to determine which vehicle is using the transponder. Another situation where verification is required with transponder usage occurs when a transponder is stolen. In this situation, it is important to verify the license plate, because law enforcement is likely to be involved.

At step 382, duplicated transactions 44 and conflicting gateway crossings are filtered out by using a unique internal system ID assigned to each transaction 44. Duplicate transactions 44 can occur, for example, when the network erroneously retransmits the transaction 44. Conflicting gateway crossing can be caused by a vehicle leaving the roadway having transactions 44 indicating a break between two trips or a crossing not physically possible to reach in the amount of elapsed time. In case of such ambiguous transactions 44, the transaction is filtered, optionally billed separately, and the transaction is logged since it may indicate a toll evader. In one embodiment, ambiguities are eliminated by filtering and giving priority to the first transaction in an ambiguous set. Processing continues at step 384.

At step 384, it is determined if video image of the license plate is unverified and selected for a random audit. If the video image is unverified and selected for a random audit, processing continues at step 386, otherwise processing continues at step 388.

At step 386, the plate read is verified and processing continues at step 227 (FIG. 4). Verification is performed manually by tasking an operator who has not yet viewed the sub-image to read the plate number. If the operator reads the same plate number, verification is successful. Otherwise, additional processing is performed by the VEP 26 as described in conjunction with FIGS. 5A-5B to determine the true plate number.

At step 388, dual detection filtering filters out the extraneous video transactions 44 and processing continues at step 390. It is possible due to equipment degradation to get separate video and AVI transactions 44 for the same toll gateway crossing. Multiple transactions 44 can result but are processed into a single detection. In one embodiment, in step 388, the detections are tagged as to the type A, A', V or V'.

At step 390, the system waits for all detections that might chain to be initially processed and audited. In order to reduce manual reads, the system can determine if license plate reads which might fit into a trip do not have to be verified manually. To reduce manual reads, the trip processor must wait for all possible detection which might be part of a trip. Because some detection might be delayed before they become available for processing or because some detection might be delayed in the auditing process, the system must wait for some detection to be processed and audited. The system 100 can either wait a long time relative to transaction processing or use a sliding time window process which identifies the time frame of available transactions for trip determination. The process for waiting for detections that might chain and the trip formation process are described in further detail in U.S. patent application Ser. No. 10/058,591, entitled Vehicle Trip Determination System And Method filed January xx, 2002. All the detections that might chain can be processed as a group with the possibility that the number of verifications is reduced. A potential trip can have any combination of A, A', V or V' detections in any number or sequence limited only by the road geometry. In practice, a single potential trip containing both A' and V' detections is rare, but the possibility does exist.

At step 391, the plurality of detections which might to from a potential trip, are chained together and processing continues at step 392.

At step 392, it is determined if there is any A' detections in the potential trip, for example if the measured Class of the vehicle corresponding to the detection is a mismatch. If there is an A' detection then processing continues at step 394, otherwise processing continues at step 396. It should be noted that all remaining detections in the potential trips are included in the detections which are processed in steps 394 and 396.

At step 394, it is determined if any A' detection is a detection having video with a final plate read. If there is a final plate read, then processing continues at step 396, otherwise processing continues at step 414. It should be noted that all remaining detections in the potential trips are included in the detections which are processed in step 414 and 396.

At step 396, it is determined if there is one and only one detection in the potential trip which is either a V or a V' detection, including for example a single gateway video trip, or a multi-gateway trip with either one video V detection or one V' detection including AVI data. Steps 396, 397, 398, 400, 404, 406, and 408 determine whether there is a relatively high probability of an error in the vehicle ID associated with one of the detections in the potential trip due to a misread of the plate characters in an image. By forcing a manual read or reread of such images, the system is able to focus VEP operator resources on the images with the highest probability of error to achieve a significant reduction in billing errors without excessively increasing VEP operator workload. A single gateway video trip occurs where a vehicle crosses a single gateway, a video image of the license plate is captured and the vehicle leaves the toll road. Such trips have a higher probability of error than trips with only A and A' detections or multi-gateway video trips because of the possibility of a single misread directly resulting in a billing error. However, it is not desirable to verify all single gateway video trips if there are a large number of such trips being traveled or RTC equipment failure at a specific location causes a large number of video only (V) detections to be created for what would otherwise be A detections. While a single gateway video trip is the simplest example of a trip that will be routed to step 397 for further consideration of the need to perform verification, step 396 also allows for the more general case of any trip with exactly one V or V' detection, but not both together in the same trip since that would be a multi-gateway video trip. If there is processing one and only one V or V' detection, continues at step 397, otherwise processing continues at step 412.

At step 397, the V or V' (of which there is only one) is selected from the plurality of detections and processed at step 398, the remaining (unselected detections) are processed at step 412.

At step 398, it is determined if this is the final plate read for this image, i.e. is the one video detection from step 397 marked as "Final Plate Read" or "Non-final" Plate Read. If this is the final plate read for the video detection then processing continues at step 412, otherwise processing continues at step 400.

At step 400, it is determined if the customer associated with this detection is a Video User, i.e. there is no registered transponder for the read plate. An unregistered user is considered a "video user" by default in one embodiment). If this customer is a Video User then processing continues at step 408, otherwise processing continues at step 404.

At step 404, it is determined whether the roadside device was operating normally, i.e. if there was no device fault or maintenance activity occurring at the time and the location of the detection. In step 404, A or A' detections which were captured as V detections due to equipment failure or maintenance, e.g., RF antenna turned off, are not verified in order to reduce the manual read workload. If either of these activities has occurred and is associated with the current detection then processing continues at step 412, otherwise processing continues at step 406.

At step 406, the plate read is verified and processing continues at step 238 (FIG. 4).

At step 408, it is determined if the VIP Match is good, i.e. a prior correlation with a verified image resulted in a match over threshold at steps 248 (FIG. 4) or 290 (FIG. 5B) resulted in a final or non-final plate read. If the VIP Match is good then processing continues at step 412, otherwise processing continues at step 406.

At step 412, the system 100 waits for required verification of all detections that might chain (similar to step 390). When a batch of detections is processed, processing continues at step 416. In one embodiment, the toll processor 28 can include a delay before processing the detection. In an alternate embodiment, the toll processor 28 can include a sliding time window, which is a different window than the window in step 390.

At step 414, the first A' detection with video in the potential trip is selected for verification at step 386. Remaining unselected detections (if any) which bypass verification are processed at step 396. At step 414, instead of verifying all of the video images in the A' detections, a single detection, here being the first A' detection, is verified resulting in fewer manual read operations.

At step 416, the detections are chained together to form a firm trip and processing continues at step 418. The details of chaining detections is described further in U.S. patent application Ser. No. 10/058,591, entitled "Vehicle Trip Determination System And Method"

At step 418, the plate reading and trip chaining process is complete and the trip can be rated and posted and the customer can be billed. At step 418, the plate reading process is complete and the detection or trip, if one is determined, can be rated and posted and the customer can be billed. After a firm trip is determined, there are no more plate reads for the chained detection. All verification and evaluation of potential trips occurs before the trip is formed. Thus, trip determination simplifies the interface to the billing system and reduces the number of manual reads. Trip processing does affect plate reading by sending detections back for manual verification, but this occurs as the result of evaluating potential trips, not firm trips. Processing continues at step 420.

At step 420, it is determined if there is IVU Fault or Plate Mismatch. If there is IVU Fault or Plate Mismatch then a notice and/or a class mismatch fine is sent to the customer in step 422 and processing terminates at step 424. At step 424, processing terminates.

Referring now to FIG. 7, at step 450 processing commences to determine if the current plate image should be added to or replace the collection of golden sub-images 66 (verified images). A history is kept on each golden sub-image 66 to determine how well it representatives the images normally captured for the vehicle. In this way, low quality images that made it through VEP but were just barely readable are eventually excluded. It is not necessary to match an unread plate image against every plate image ever taken of the vehicle.

Maintaining quality images for correlation matches minimizes the number of manuals reads ultimately required for the transaction 44. It will be appreciated by those of ordinary skill in the art that there are several methods to maintain image quality and to determine when a golden sub-image 66 should be replaced At step 452, it is determined whether the maximum number of golden sub-image(s) have been saved. In one embodiment the maximum number is three images. If less than the maximum number of images has been saved processing continues at step 462, otherwise processing continues at step 454.

At step 454, a determination is made if any golden sub-image 66 is replaceable. A golden sub-image 66 is preferably replaceable if the sum of its hits and strikes exceeds a configurable sample size, and hits/(hits+strikes) is less than a configurable threshold. In one embodiment, the sample size is eight and the threshold is 0.5. A "hit" is counted each time a correlation match to the golden sub-image 66 results in a match confidence greater than or equal to the System Match Threshold and the sub-image being processed is not declared unreadable or read differently by a subsequent VEP operator. A "strike" is counted each time a correlation match to the golden sub-image 66 results in a match confidence less than the System Match Threshold and the sub-image being processed is not declared unreadable or read differently by a subsequent VEP operator. A "balk" is logged for analysis purposes when a correlation match to a golden sub-image 66 results in a match confidence greater than or equal to the System Match Threshold and the sub-image being processed is read differently by a subsequent VEP operator. If no image can be replaced, processing continues at step 458 and control returns to step 224 (FIG. 4.) where the plate number is considered a Final Plate Read. If one of the golden sub-images 66 is replaceable processing continues at step 456.

At step 456, one of the Replaceable golden sub-images 66 is replaced and the plate number (either the VIP or VEP plate number since they are identical at this step) is considered a Final Plate Read and processing continues at step 458 and control returns to step 224 (FIG. 4) where the plate number is considered a Final Plate Read.

At step 462, the current sub-image is added to the golden set (set of verified images) and the last plate number read is considered a Final Plate Read and processing continues at step 458 and control returns to step 224 (FIG. 4.) where the plate number is considered a Final Plate Read.

All publications and references cited herein are expressly incorporated herein by reference in their entirety.

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims.

What is claimed is:

1. A method for reading a license plate disposed on a vehicle, the method comprising:

determining whether a license plate image is required in response to an attempt to read a vehicle transponder, wherein the vehicle transponder is at least one of absent, indicative of a vehicle class mismatch or on an exception list;

capturing the license plate image;

retrieving at least one verified image associated with the license plate image;

automatically processing the license plate image, wherein the automatically processing comprises comparing the license plate image with the at least one verified image; and determining whether to manually read the license plate image in response to the comparing.

2. The method of claim 1 further comprising manually reading the license plate image.

3. The method of claim 2 wherein manually reading the license plate image comprises providing a sub-image for reducing license plate image storage.

4. The method of claim 3 wherein providing a sub-image comprises zooming in on the license plate in the license plate image.

5. The method of claim 2 wherein manually reading the license plate image comprises:

displaying the license plate image to at least three different operators;

entering at least three license plate numbers as determined by the at least three different operators; and determining if at least two of the at least three determined license plate numbers are identical.

6. The method of claim 1 wherein comparing the license plate image comprises correlating the license plate image with the at least one verified image.

7. The method of claim 6 further comprising:

generating feature data derived from the license plate image; and generating feature data derived from the at least one verified image, wherein the correlating comprises correlating the feature data derived from the license plate image with the feature data derived from the at least one verified image.

8. The method of claim 6 further comprising:

providing a match confidence measure; and determining whether the license plate image should be read manually in response to comparing a match confidence measure to a predetermined match threshold.

9. The method of claim 8 further comprising:

manually reading the license plate image in response to the match confidence measure being less than the predetermined match threshold.

10. The method of claim 1 wherein automatically processing the license plate image comprises using optical character recognition for recognizing a license plate number.

11. The method of claim 10 further comprising:

providing a read confidence measure in response to recognizing the license plate number;

comparing the read confidence measure to a predetermined read threshold; and determining in response to the read confidence measure being less than the predetermined read threshold that the license plate image should be read manually.

12. The method of claim 1 further comprising detecting the vehicle, wherein detecting the vehicle comprises at least one of:

reading the transponder disposed on the vehicle;

scanning the vehicle with a laser beam; or sensing the vehicle with an induction loop.

13. The method of claim 1 wherein the comparing the license plate image comprises matching the license plate image with the at least one verified image.

14. The method of claim 13 further comprising:

generating feature data derived from the license plate image; and generating feature data derived from the at least one verified image, wherein the matching comprises matching the feature data derived from the license plate image with the feature data derived from the at least one verified image.

15. The method of claim 1 further comprising updating the at least one verified image.

16. The method of claim 1 further comprising:

determining whether the license plate number associated with the license plate image is a registered plate number; and bypassing manually rereading the license plate image in response to determining that the license plate number associated with the license plate image is a registered plate number.

17. The method of claim 1 further comprising:

manually reading the license plate image for providing a manually read license plate number;

automatically reading the license plate image for providing an automatically read license plate number;

comparing the manually read license plate number and the automatically read license plate number; and bypassing manually rereading the license plate image in response to determining that the manually read license plate number and the automatically read license plate number are identical.

18. The method of claim 1 further comprising:

providing an automatically read license plate number in response to automatically processing the license plate image;

associating a transponder reading with a transponder registered license plate number;

comparing the automatically read license plate number and the transponder registered license plate number; and determining whether to manually read the license plate image in response to determining that the automatically read license plate number and the transponder registered license plate number are identical.

19. The method of claim 1 further comprising:

determining if the license plate image should be discarded; and discarding the license plate image in response to determining the license plate image should be discarded.

20. The method of claim 1 wherein retrieving at least one verified image comprises:

providing at least one stored image of the license plate and a corresponding license plate number;

verifying the at least one stored image for providing the at least one verified image.

21. The method of claim 20 wherein verifying the at least one stored image comprises:

manually reading the license plate image for providing a manually read license plate number;

associating a transponder reading with a transponder registered license plate number; and determining that the manually read license plate number and the transponder registered license plate number are identical.

22. The method of claim 20 wherein verifying the at least one stored image comprises:

manually reading the license plate image for providing a manually read license plate number;

automatically reading the license plate image for providing an automatically read license plate number; and determining that the manually read license plate number and the automatically read license plate number are identical.

23. The method of claim 20 further comprising adding a new license plate image to a set of verified images in response to verifying the at least one stored image and in response to the set having fewer than a maximum number of images for the corresponding license plate number.

24. The method of claim 20 further comprising updating one of the at least one verified image if the one of the at least one verified image is replaceable.

25. The method of claim 24 further comprising determining that the one of the at least one verified image is replaceable in response to determining that an image quality ratio of the one of the at least one verified image is less than a predetermined threshold and determining that a number of correlation matches associated with the image quality ratio is greater than a predetermined sample size.

26. The method of claim 25 wherein the image quality ratio comprises a ratio of a hit count divided by a sum of the hit count and a strike count.

27. The method of claim 26 wherein the hit count includes the number of correlation matches having a match confidence measure greater than or equal to a predetermined match threshold and the license plate image is readable and manual reads of the license plate image are consistent.

28. The method of claim 26 wherein the strike count includes a number of correlation matches having a match confidence measure less than a predetermined match threshold and the license plate image being processed is readable and all manual reads of the license plate image are consistent.

29. The method of claim 1 further comprising:

arranging a plurality of roadside toll collectors at intervals along a roadway, each roadside toll collector coupled to at least one of: a traffic probe reader, a toll gateway or an enforcement gateway, for reading a transponder disposed on a vehicle;

determining a license plate number corresponding to the transponder reading from the vehicle;

comparing the license plate number corresponding to the transponder to the license plate number recognized from the license plate image; and determining in response to the plate number corresponding to the transponder being the same as the license plate number recognized from the license plate image that further identification of the license plate is not required.

30. The method of claim 1 further comprising:

combining a plurality of transactions to form a trip; and associating a license plate identification from a first transaction of the trip with a different second transaction for minimizing the number of manual reads.

31. The method of claim 1, wherein the determining whether a license plate image is required further comprises determining whether a license plate image is required in response to at least one of, a customer audit, a system audit, or a system maintenance.

* * * * *

UNITED STATES PATENT AND TRADEMARK OFFICE

CERTIFICATE OF CORRECTION

PATENT NO. : 7,339,495 B2
APPLICATION NO. : 11/231102
DATED : March 4, 2008
INVENTOR(S) : Douglas M. Kavner It is certified that error appears in the above-identified patent and that said Letters Patent is hereby corrected as shown below:

Column 1, line 7 delete “application a” and replace with --application is a--

Column 2, line 26 delete “an” and replace with --a-- (First Occurrence)

Column 2, line 52 delete “threshold With” and replace with --threshold. With--

Column 3, line 18 delete “embodiment traffic” and replace with --embodiment, traffic--

Column 3, line 26 delete “aspect the” and replace with --aspect of the--

Column 4, line 25 delete “is” and replace with --are--

Column 5, lines 66-67 delete “of automatic” and replace with --of an automatic--

Column 6, line 11 delete “embodiment the” and replace with --embodiment, the--

Column 6, line 38 delete “embodiment the” and replace with --embodiment, the--

Column 6, lines 45-46 delete “entitled Predictive Automatic Incident Detection Using Automatic Vehicle Indication filed” and replace with --entitled “Predictive Automatic Incident Detection Using Automatic Vehicle Indication,” filed--

Column 7, line 18 delete “cameras” and replace with --camera--

Column 7, line 23 delete “that are” and replace with --that there are--

Column 8, line 5 delete “of a” and replace with --of--

Column 8, line 50 delete “TG 18s,” and replace with --TGs 18,--

Column 8, line 51 delete “gateway 17” and replace with --gateways 17.--

Signed and Sealed this

Twenty-third Day of November, 2010

David J. Kappos

David J. Kappos
*Director of the United States Patent and Trademark Office*

Column 8, line 52 delete “RTCs” and replace with --RTCs 14,--

Column 9, line 4 delete “operation the” and replace with --operation, the--

Column 9, line 4 delete “request” and replace with --requests--

Column 9, line 17 delete “processing license” and replace with --processing the license--

Column 9, line 20 delete “embodiment VIP” and replace with --embodiment, VIP--

Column 9, line 24 delete “arrangement the” and replace with --arrangement, the--

Column 9, line 52 delete “number” and replace with --numbers--

Column 12, line 7 delete “number processing” and replace with --number, processing--

Column 12, line 13 delete “threshold processing” and replace with --threshold, processing--

Column 12, line 35 delete “intercept” and replace with --intercepts--

Column 13, line 21 delete “image processing” and replace with --image, processing--

Column 13, line 22 delete “image processing” and replace with --image, processing--

Column 13, line 44 delete “threshold processing” and replace with --threshold, processing--

Column 13, line 47 delete “threshold processing” and replace with --threshold, processing--

Column 14, line 13-14 delete “threshold processing” and replace with --threshold, processing--

Column 14, line 17 delete “threshold processing” and replace with --threshold, processing--

Column 14, line 39 delete “reads” and replace with --reads.--

Column 14, line 57-58 delete “found the” and replace with --found, the--

Column 14, line 61 delete “enabled processing” and replace with --enabled, processing--

Column 15, line 9 delete “step 272 a” and replace with --step 272, a--

Column 15, line 18 delete “embodiment multiple” and replace with --embodiment, multiple--

Column 15, line 28 delete “step 270 otherwise” and replace with --step 270, otherwise--

Column 15, line 30 delete “step 282 if” and replace with --step 282, if--

Column 15, line 35 delete “condition a” and replace with --condition, a--

Column 15, line 45-46 delete “for latest” and replace with --for the latest--

Column 15, line 54 delete “different the” and replace with --different, the--

Column 16, line 37 delete “tack” and replace with --task--

Column 16, line 38 delete “task processing” and replace with --task, processing--

Column 16, line 47 delete “threshold processing” and replace with --threshold, processing--

Column 16, line 50 delete “threshold processing” and replace with --threshold, processing--

Column 16, line 65 delete “step 322 a” and replace with --step 322, a--

Column 16, line 67 delete “occur for example when” and replace with --occur, for example, when--

Column 17, line 29 delete “with” and replace with --, which--

Column 17, line 33 delete “is result” and replace with --is a result--

Column 17, line 37 delete “situation” and replace with --situations--

Column 17, line 46 delete “includes have only” and replace with --includes only--

Column 17, line 56 delete “A’, detections,” and replace with --A’ detections,--

Column 18, line 36 delete “crossing” and replace with --crossings--

Column 18, line 45 delete “if video” and replace with --if the video--

Column 19, lines 15-16 delete “Vehicle Trip Determined System and Method filed January xx, 2002” and replace with --“Vehicle Trip Determined System and Method,” filed January 28, 2002--

Column 19, lines 23-24 delete “which might to from” and replace with --, which might form--

Column 19, line 29 delete “detection then” and replace with --detection, then--

Column 19, lines 39-40 delete “step 414 and 396” and replace with --steps 414 and 396--

Column 20, line 4 delete “processing one” and replace with --processing of one--

Column 20, line 5 delete “continues” and replace with --processing continues--

Column 20, line 14 delete “detection then” and replace with --detection, then--

Column 20, line 20 delete “embodiment).” and replace with --embodiment.--

Column 20, line 21 delete “User then” and replace with --User, then--

Column 20, line 31 delete “detection then” and replace with --detection, then--

Column 20, line 39 delete “good then” and replace with --good, then--

Column 21, line 9 delete “Mismatch then” and replace with --Mismatch, then--

Column 21, line 17 delete “representatives” and replace with --represents--

Column 21, line 24 delete “manuals reads” and replace with --manual reads--

Column 21, line 31 delete “embodiment the” and replace with --embodiment, the--

Column 21, lines 32-33 delete “has been saved processing” and replace with --have been saved, processing--

Column 21, line 57 delete “replaceable processing” and replace with --replaceable, processing--

Column 26, line 4 delete “of, a” and replace with --of a--